Nov. 10, 1970     R. E. SPARKS     3,539,492

STENCIL CAP AND PROCESS OF MAKING

Filed Nov. 24, 1967

INVENTOR.
ROBERT E. SPARKS

BY

ATTORNEYS.

United States Patent Office 3,539,492
Patented Nov. 10, 1970

3,539,492
STENCIL CAP AND PROCESS OF MAKING
Robert E. Sparks, Cleveland Heights, Ohio, assignor, by mesne assignments, to Mohawk Industries International Incorporated, Willoughby, Ohio, a corporation of New York
Filed Nov. 24, 1967, Ser. No. 685,523
Int. Cl. B01k 3/10
U.S. Cl. 204—282
7 Claims

ABSTRACT OF THE DISCLOSURE

A stencil cap adapted to be readily mounted on, and removed from, the end portion of an electrode of electrolytic marking apparatus, the cap having a relatively rigid strong inner member of relatively non-water absorbent material capable of maintaining its shape and size in use and subjected to water-containing electrolytic fluid, a relatively flexible stencil film adapted to bear indicia to be marked and drawn in pleats or folds around and embracing the outer wall of the inner member to be supported thereby, and a relatively rigid strong outer member of relatively non-water absorbent material surrounding and embracing the drawn pleated portion of the stencil film to tightly hold the stencil film between the inner and outer members, the drawn pleated portion being bonded to at least one of the members. The stencil cap so formed is capable of repeated mounting on and off an electrode in uniform tight fit thereon and withstands appreciable swelling and distortion through absorption of water from the electrolyte.

Included, is the process of forming such a stencil cap by placing an open-ended inner member over an electrode form to embrace the outer wall thereof, placing a stencil film over the electrode form and inner member, including placing a pad between the end of the electrode and a central portion of the stencil film adapted to bear indicia, drawing the border portion of the film downwardly and around the outer wall of the inner member and pleating the drawn down portion, bonding the pleated drawn-down portion to the inner member, and placing an open-ended outer member around the drawn-down pleated portion of the film to embrace the same and tightly hold the pleated portion between the inner and outer members, the inner and outer members generally complementing the shape of the outer wall of the electrode end portions.

---

An object of my invention is to provide an improved stencil cap that can withstand repeated mounting to and removal from the end portion of an electrode used in electrolytic marking apparatus without such distortion, crushing, and swelling of the stencil cap as might cause it to bind on the electrode or to fail to easily fit in a complementary manner on the electrode.

Another object is the provision of an improved process that is both efficient, uniform and economical for the making of such stencil caps.

Examples of electrolytic marking devices utilizing electrodes using stencil caps of the general kind to which my invention is directed are found in U.S. Pat. No. 2,967,813 issued Jan. 10, 1961 and No. 3,130,141 issued Apr. 21, 1964.

There are electrolytic marking electrodes that are manipulated automatically as in the above patents and there are electrolytic marking electrodes that may be manipulated manually, as in U.S. Pat. No. 2,798,849 issued July 9, 1957. Some electrodes carry a stencil cap on a head on the electrode in which the side wall of the cup-shaped stencil cap is inserted in a groove, such as in said Pat. No. 2,798,849, and some electrodes carry a stencil cap on the end portion of the electrode by fitting over the end of the electrode with the side wall of the cup-shaped stencil embracing the outer surface or wall of the electrode end portion, as for example on the electrode shown in FIG. 1 hereof.

An object of this invention is to improve a stencil cap having marked advantages over the prior stencil caps and overcoming the defects thereof, such defects including the swelling of the stencil cap by reason of absorption of water, the weakness and inability of the stencil cap to sustain its shape and dimensions, the distortion of the stencil cap, and either the undesired looseness of the stencil cap on the electrode or the undesired binding and adherence of the stencil cap to the electrode.

Other objects and a fuller understanding of this invention may be had by referring to the following description and claims, taken in conjunction with the accompanying drawings, in which:

Figure 1:
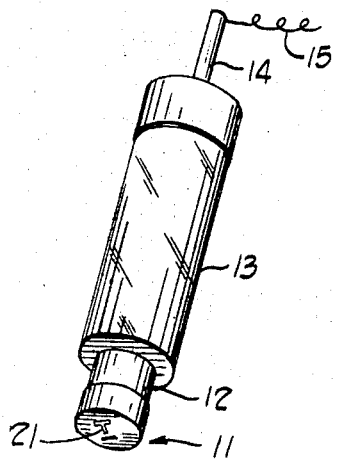
FIG. 1 is a perspective view of a typical electrode utilized in electrolytic marking of metal work pieces, and to which my improved stencil cap is shown mounted on the forward end portion of the electrode.

Stencil caps of the general class to which this invention is directed have heretofore been fabricated in a number of ways, the most usual and common way being as follows:

First, wrapping several turns of cellophane or paper-tape around the end of an electrode or fascimile thereof, called a dummy (either being herein referred to as an electrode form) with the sticky or adhesive coated side of the tape directed outwardly; second, usually placing a disc or pad of absorbent material such as cloth, over the end of the electrode form; third, drawing down over the tape-wrapped electrode form a stencil film (of paper, nylon cloth or other appropriate flexible sheet material treated with suitable photosensitive material) to position a central indicia-carrying portion over the flat end of the form and covering the bsorbent pad thereon and to drawing the surrounding portions downwardly, pleating the same to conform to the drawing action, around the tape-wrapped form in generally cylindrical shape and in contact with the sticky side of the tape; and fourth, wrapping several turns of cellophane or paper-base tape around the outside of the drawn-down cylindrical portion of the film with the sticky side of the tape inwardly against this cylindrical portion. Thereafter, sometimes shellac or similar water-proofing material was added to the cylindrical portion of the cap comprising inner tape, drawn-down film and outer tape, to add some small measure of strength and rigidity to the cap. The resulting stencil cap was however unsatisfactory and inadequate in several respects.

The cellophane tape and to some degree the film particularly of paper, have a relatively high degree of water absorption qualities. Upon being subjected to water-containing electrolytic fluid this cellophane tape and film, particularly paper, tend to absorb water to a considerable degree and thereby to swell and enlarge in volume. This swelling causes the stencil cap by this distortion to tend to bind and stick on the electrode to which mounted, particularly when the outer surface of the outside tape, that is the exterior of the cylindrical wall of the cap, is coated with firm water-proofing material restraining outward expansion. In some instances wherein there is not sufficient external restraint by the outer tape the stencil cap may become enlarged and tend to fall off inadvertently from the electrode.

Also, such stencil caps as previously made did not have sufficient strength, rigidity, and wear resistance to withstand the need for frequent handling, including mounting on and removal from the electrode as different indicia are to be marked with the same electrode.

The present invention is directed toward meeting and overcoming these and other problems, disadvantages and inadequacies of the prior stencil caps.

My stencil cap denoted generally by the reference character 11 is of general cup shape and fits over the forward end of an electrode 12 of electrolytic marking apparatus. Normally, but not always, the forward end of the electrode is cylindrical in shape and for purposes of simplicity the electrode 12 is shown as cylindrical and the cap 11 of complementary shape. However, my cap can have other approximate shapes to complement the respective shapes of the electrodes upon which mounted.

The electrode 12 is of porous carbon and may have fine holes extending therethrough to facilitate the passage of electrolytic fluid through the electrode. The upper end of the electrode 12 extends into a cylindrical reservoir 13 adapted to contain a supply of water-containing electrolytic fluid. The fluid in reservoir 13 may seep or slowly pass longitudinally through the electrode 12 to the flat surface at the forward end of the electrode.

An electric conductor 14 passes through the reservoir 13 and is electrically connected to the electrode 12 whereby both fluid and electrical potential may be supplied to the forward end face of the electrode. A wire 15 electrically connects the conductor 14 to a suitable source of electrical potential. Electrical potential of an opposite polarity is connected to a metal work piece to be electrolytically marked with the electrode with stencil cap thereon as in the usual and well known manner.

Figure 2:
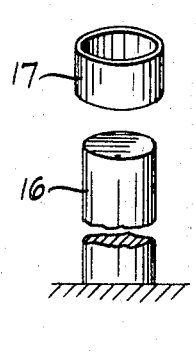
FIG. 2 is a view, on a larger scale than that of FIG. 1, showing an early step in the making of my improved stencil cap.

In the making of my improved stencil cap 11, there is first placed over the forward end of an electrode form 16 (either a real electrode or a dummy electrode having the particular shape intended for use), an open-ended plastic cylinder 17 as illustrated in FIG. 2, until the cylinder 17 fits around the end portion of the electrode and flush with its end. The cylinder 17 is dimensioned to provide a snug fit on the electrode so that it may be readily slid on and off but at the same time does not easily fall off the electrode and is frictionally retained thereon.

The cylinder 17 is preferably made of sheet plastic in annular form and of a solid plastic material that is relatively non water absorbent, that is absorbs very little water, and hence has a minimization of swelling from water in the electrolytic fluid to which subjected. The thickness of the sheet plastic of which the cylinder 17 is made may preferably be in the range of about 0.003 to 0.150 inch, and more preferably in the range of about 0.012 to 0.033 inch. Some suitable plastics for the cylinder because of their relative rigidity and relatively low water absorption qualities would include polystyrene, polymethyl methacrylate, polycarbonates, cellulose acetate butyrate, polypropylene, cellulose acetate propionate, phenolics, solid expoxies, rigid vinyls and high density polyethylene.

A preferred cellulose acetate butyrate utilized as the material for the cylinder 17 has a degree of water absorption in the range of 0.9–2.2%.

Figure 3:
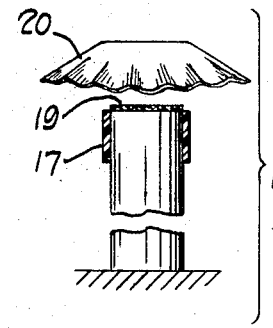
FIG. 3 is a view like that of FIG. 2 but showing a successive step in the making of the stencil cap.

After the mounting of the cylinder 17 snugly over the end of electrode form 16 a stencil film 20, preferably in the form of a round piece in the case of a cylindrical form of electrode, is positioned over the assembled electrode 16 and cylinder 17 as shown in FIG. 3. The stencil film is usually of paper or nylon or other fabric treated with a resist material impervious to fluid, except at the location of indicia 21 which is porous or open to permit electrolytic fluid to leak through the indicia area but not elsewhere. Such stencil films and the making thereof are well known.

Usually a pad or disc 19 of absorbent material such as matted or felted cotton or fabric is placed between the film 20 and end face of the electrode. The pad 19 may be inserted in the cap after forming or if desired, the pad 19 may be placed over the end of electrode form 16 prior to the placing of the film over the electrode as illustrated in FIG. 3.

Figure 4:
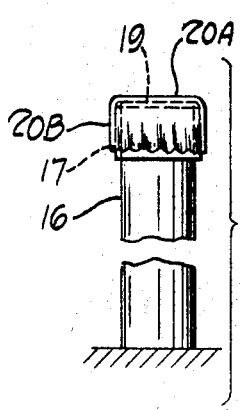
FIG. 4 illustrates a next successive step in the making of the cap.

Next the border region surrounding the flat central area, over the end face of the electrode form, is drawn downwardly to form the pleated side wall 20B of general cylindrical shape snugly engaging the outer wall of the inner member or cylinder 17, as shown in FIG. 4. The pleating of the border region of the film permits the film to readily conform to the required cylindrical shape. The pleating need not be regular or uniform as it is only necessary to obtain the required shape. Indeed, "pie crusts" or similar segments may first be removed from the film border region to aid in the forming of the same to cylindrical shape.

In many cases it is desired, and it is preferably recommended, that the drawn-down portion 20B in cylindrical form be bonded to the outer wall of the inner plastic member 17. The bonding may be done at this stage or at a later stage to be described.

Figure 5:
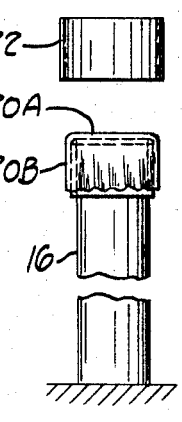
FIG. 5 illustrates a still further successive step in the making of the cap.
Figure 6:
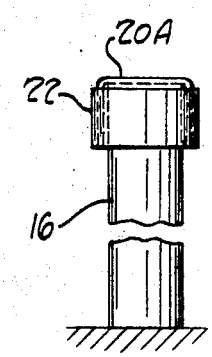
FIG. 6 illustrates a step in the completion of the cap.

Next, as shown in FIGS. 5 and 6, an outer annular member or open-ended cylinder 22 is positioned over and tightly about the drawn-down film portion 20B to firmly embrace this film portion 20B of cylindrical shape between the inner and outer members 17 and 22. Upon obtaining a firm and tight embrace about portion 20B so as to clamp it between members 17 and 22, the bonding of the portion 20B to members 17 and 22 by an adhesive or solvent may not be necessary. For this purpose the outer member 22 may be somewhat resiliently flexible so as to maintain such a firm embrace. For this purpose the outer member 22 may have rubber-like characteristics and be made of a suitable rubber composition. Also, the plastic materials having relatively low water-absorbent characteristics such as those mentioned as suitable for the inner member 17 may be utilized. The outer member 22 may be thinner and less rigid than the inner member 17 as it need not withstand the same compressive force, and also the thinness of the wall of outer member 22 may provide it with the required flexibility and sufficient resiliency to afford the required tight embrace of the outer member about the film portion 20B and inner member 17.

In those instances wherein it is also desired to bond or adhere the turned-down portion 20B of the film to the members 17 and 22, or at least to the inner member 20, a solvent cement or bodied cement is applied. It may be applied to portion 20B before the outer member 22 is mounted in position or afterwards so as to bond the entire assembly together. It may be applied by brushing, dipping, spraying or imbibition by capillary forces.

The solvent used for bonding will, of course, depend on the polymer or polymers used for the members 17 and 22, respectively. As a preferred plastic for members 17 and 22 is cellulose acetate butyrate; suitable solvents for the same include appropriate ketones, such as acetone, methyl ethyl ketone, methyl iso-butyl ketone, and cyclohexanone; appropriate esters such as methyl acetate, ethyl acetate, propyl acetate, butyl acetate, amyl acetate, ethyl formate, propyl formate, butyl formate, amyl formate, methyl propionate, ethyl propionate and propyl propionate; and appropriate chlorinated hydrocarbons such as methylene chloride and ethylene dichloride; and appropriate aromatics such as benzene and toluene; and mixtures of the above. A suitable bodied cement could be compounded from any of the selected solvents or mixtures thereof by dissolving therewith polymers the same or similar to the polymer of the plastic cylinder or member 17 or 22 being bonded. The dissolved polymer may be of higher or lower molecular weight than the polymer being bonded.

Another type of cement suitable for bonding many polymers consists of a solution of monomer of the ring polymer or a similar polymer, mixed with an accelerator prior to use. In this case, the polymer forms after it is placed in position. A solvent may or may not be present. An inhibitor is usually added to the monomer solution to inhibit polymerization in storage. The monomer may have been polymerized partially before it is mixed with the accelerator as, for example, in certain epoxy cements.

A preferred solvent for cellulose acetate butyrate is a bodied cement of cellulose acetate butyrate in a mixture of methyl isobutyl ketone, methyl ethyl ketone and ethylene dichloride.

It is also desirable to have the solvent, used alone or as the solvent base for the bodied cement, dissolve totally or partially the polymerized portion of the stencil coating, which is sealed between the two cylinders. This improves the security with which the stencil substrate is held. The solvent will be determined by the particular photosensitive coating employed, but examples of solvents suitable for both cellulose acetate butyrate and a typical photosensitive coating are methyl ethyl ketone and methylene chloride.

Many commercial proprietary cements are compounded from materials similar to those discussed above and are suitable for the required bonding.

Figure 7:
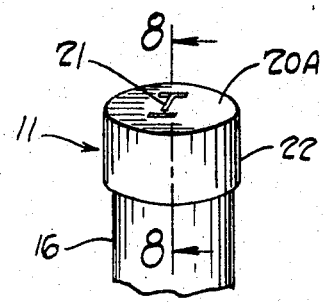
FIG. 7 shows a perspective view of the complete stencil cap made in accordance with my invention.
Figure 8:
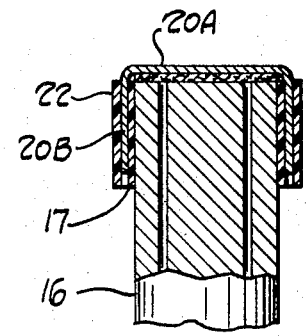
FIG. 8 is a cross-sectional view on an enlarged scale of the stencil cap shown in FIG. 7 and showing details of its construction.

After the forming of the stencil cap as above described it has the general structure of the cap shown in FIG. 7, and of which a cross-sectional view is shown in FIG. 8. The formed stencil cap 11 may be readily slid off the end of electrode form 16, and used as needed on electrodes of that particular shape and size to electrolytically mark metal work pieces with the indicia represented by the reference character 21 on the film portion 20A.

The making of the film and indicia thereon by use of photosensitive material and resist material are well known in the art.

By means of my improved stencil cap and the means of making it, there are provided strong, long-lasting stencil caps capable of many repeated uses, and of being mounted on and removed from an electrode without distortion binding or difficulty but with speed and facility.

The present disclosure contains that set forth in the appended claims as well as in the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A stencil cap for an electrolytic marking electrode having an end portion adapted to be frictionally embraced by the cap, said cap being mountable and demountable as a unit assembly from said end portions of the electrode, said cap comprising an open-ended inner member complementing the outer wall of, and adapted to tightly embrace, said end portion, said inner member being sufficiently rigid as to be self sustainable in a normal form during the usual use of the stencil cap in being placed on and taken off said end portion of the electrode, a stencil film of relatively flexible material having a central portion adapted to bear indicia to be marked with the electrode and to be disposed over the end surface of said electrode, said stencil film having a border portion formed in pleats and extending generally normal to the plane of said central portion to form a cup shape, said border portion extending in cylindrical form around the major portion of the circumferential extent of said inner member, said border portion lacking sufficient rigidity to be self-sustainable in a normal form during the usual use of the stencil cap in being placed on and taken off of said end portion of the electrode, said border portion being disposed about, closley adjacent, and embracing the outer wall of said inner member, and an open-ended outer member disposed about and embracing said border portion of the stencil film around the circumferential extent of said border portion, the said border portion being held tightly between, and in inter-engagement with, said inner and outer members and being sustained in the shape of said inner member by the embrace thereabout of said outer member, said inner member being composed of a material that is relatively non-water absorbent to resist expansion and distortion from said form complementing the outer wall of said electrode end portion in the use of the electrode and stencil cap in contact with water-containing electrolytic fluid.

2. A stencil cap as claimed in claim 1 and in which said outer member is also of a material that is relatively non-water absorbent.

3. A stencil cap as claimed in claim 1 and in which at least said inner member is composed of a material having relatively non-absorbent and relatively rigid characteristics and selected from the group consisting of polystyrene, polymethyl methacrylate, nylon, polycarbonates, cellulose acetate butyrate, polypropylene, cellulose acetate propionate, solid epoxies, rigid vinyls, and high density polyethylene.

4. A stencil as claimed in claim 3 and in which the said cellulose acetate butyrate has a degree of water absorption in the range of 0.9–2.2%.

5. A stencil cap adapted to hold the indicia bearing film portion of the stencil cap to the end portion of an electrolytic electrode by frictional fit and to be removed therefrom against the grip of the frictional fit for replacement of the stencil cap, said stencil being cup-shaped to complement the shape of said electrode end portion, said cap comprising a film of porous paper, nylon fabric or the like having an indicia formed in a flat face portion thereof for electrolytic marking of metal with said indicia, the film having a wall portion extended normal to said flat face portion and disposed in a normal shape complementing, and extending around the major portion of the outermost wall surface of, the outer wall of said electrode end portion, an inner member disposed inwardly of, and in inter-engagement with, said wall portion to support, and maintain the shape of, said wall portion said inner member being relatively rigid and strong to maintain said normal shape in normal handling of placing of the stencil cap and on and off the electrode end portion, an outer member disposed outwardly of, and in inter-engagement with, said wall portion and compressing the same about said inner member, and a bonding material bonding said wall portion of the film to at least said inner member, said inner member having a substantially greater rigidity and strength, and a substantially greater resistance to water absorption and swelling from the water of the electrolyte with which used than the wall portion of said film, said inner member being of a material to provide with said wall portion and outer member embracing the same sufficient rigidity, maintenance of dimensions, and strength to permit repeated placing of the stencil cap as an assembled unit on an electrode about the outermost wall surface thereof and removal therefrom without collapse of the stencil cap or binding thereof on the electrode during normal use of the electrode in electrolytic marking.

6. A stencil cap as claimed in claim 7, and in which at least said inner member is of a material having the relatively non-water absorbent characteristics and the relatively rigid nature of solidified plastic and selected from the group consisting of polystyrene, polymethyl, methacrylate, polycarbonates, cellulose, acetate butyrate, polypropylene, cellulose acetate propionate, phenolics, epoxies, rigid vinyls, and high-density polyethylene.

7. A stencil cap as claimed in claim 6, and wherein said bonding material penetrates said wall portion of the said film and includes a solvent reactive with the material of the inner member to form a solid bond with the outer member.

References Cited

UNITED STATES PATENTS 2,798,849  7/1959  Lindsay _____ 204—224

JOHN H. MACK, Primary Examiner

S. S. KANTER, Assistant Examiner

U.S. Cl. X.R.

204—224